May 1, 1956 J. JORGENSEN ET AL 2,743,563
RECEPTACLE LOADER
Filed July 13, 1953 14 Sheets-Sheet 4

INVENTORS
Julius Jorgensen
Arnold R. Buchholz
BY Quarles & French
Att'ys.

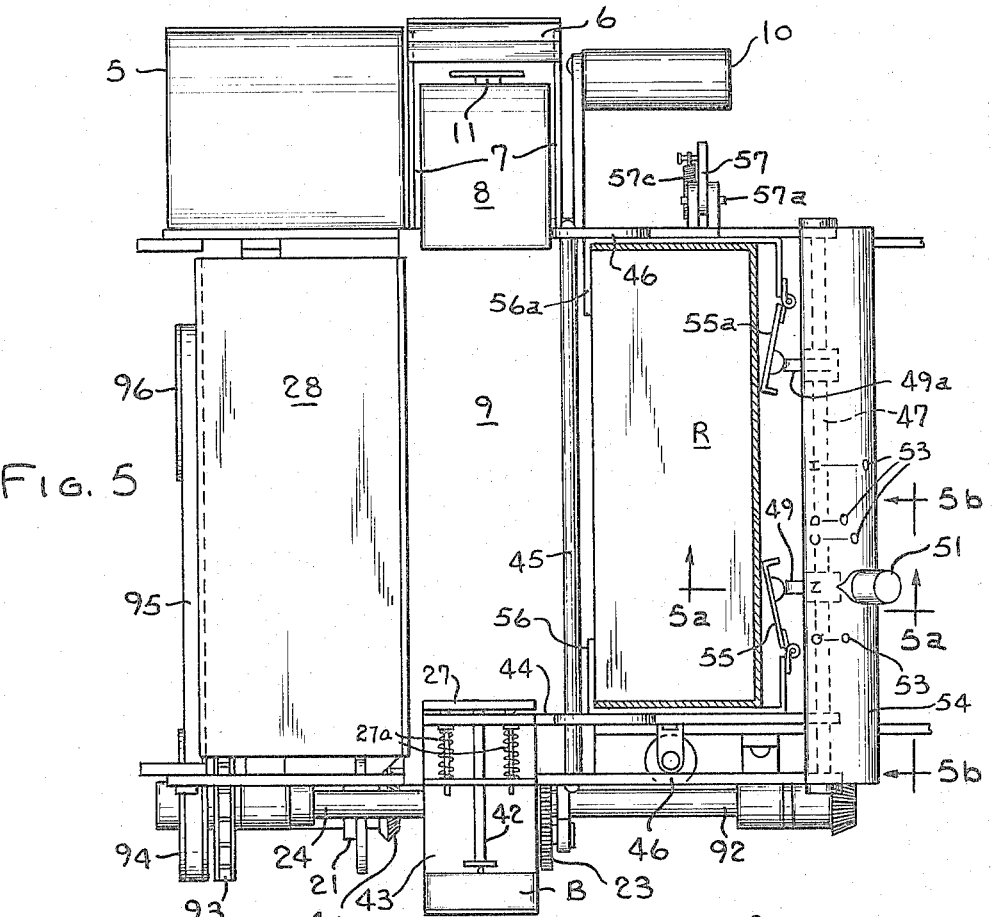
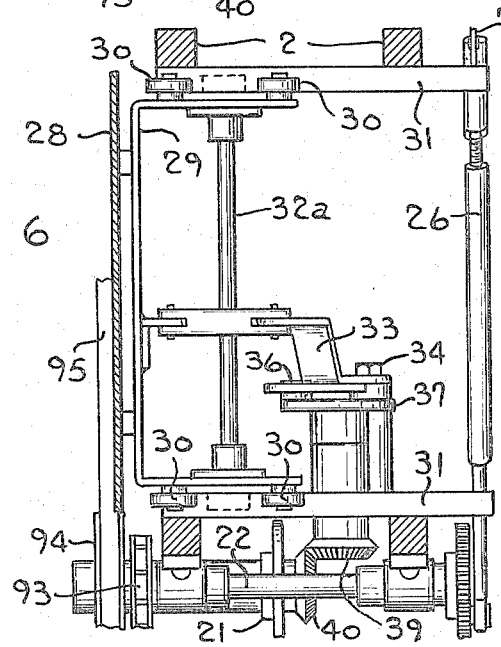
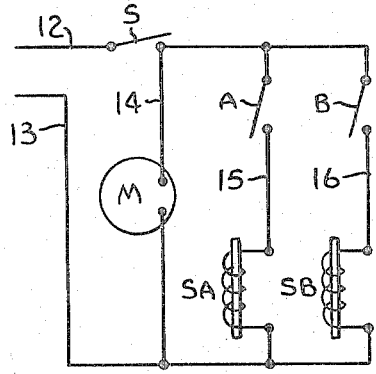

May 1, 1956  J. JORGENSEN ET AL  2,743,563
RECEPTACLE LOADER
Filed July 13, 1953  14 Sheets-Sheet 7

INVENTORS
Julius Jorgensen
Arnold R. Buchholz
BY Charles French
Att'ys.

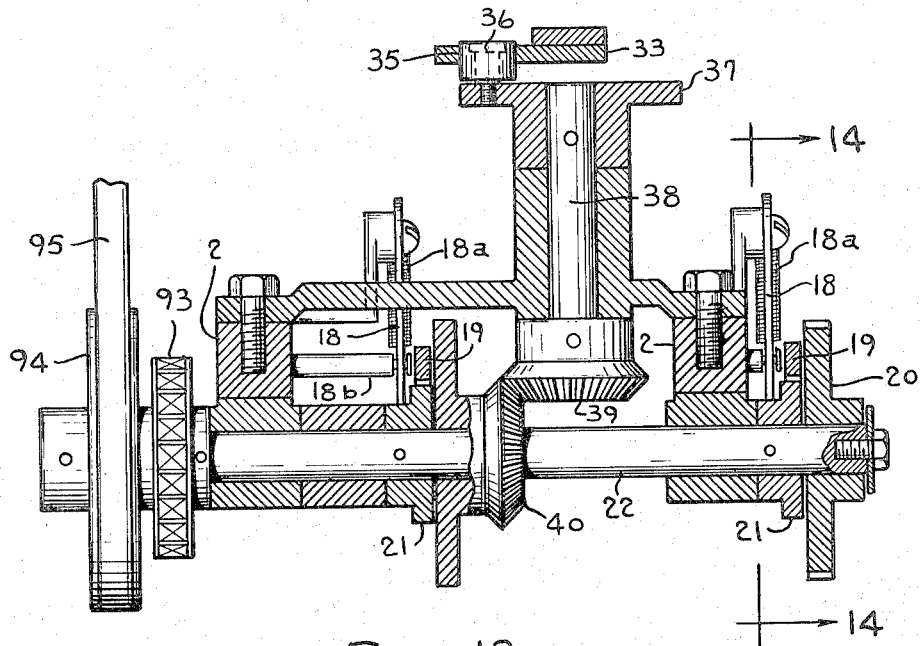
FIG. 13
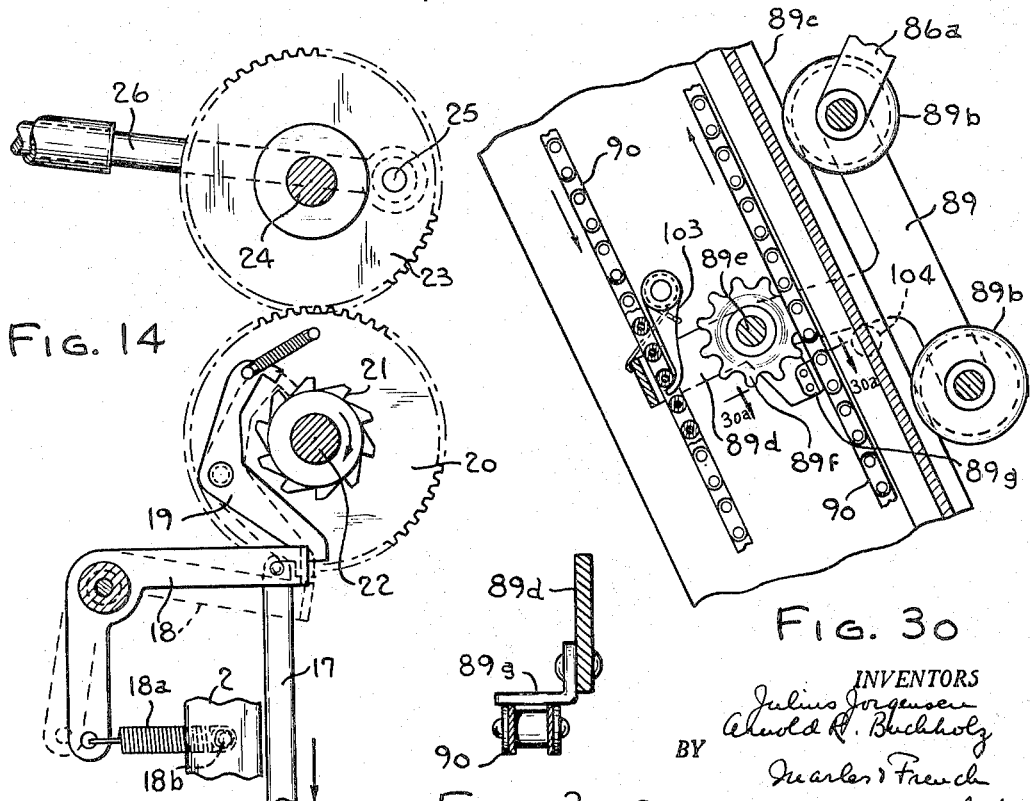
FIG. 14
FIG. 30
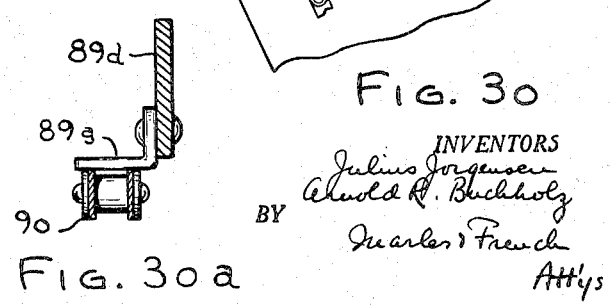
FIG. 30a

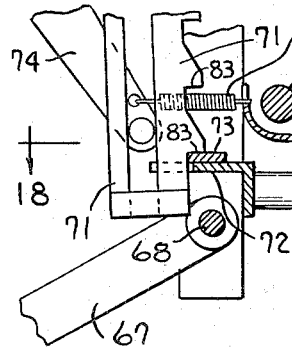
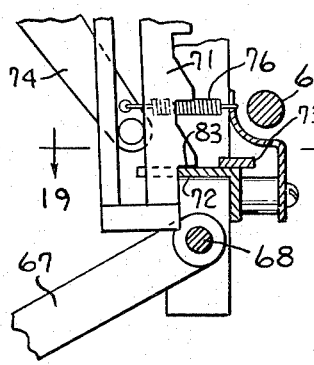
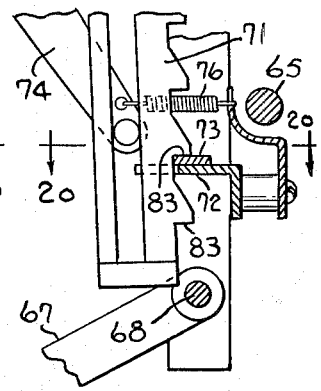
Fig. 15  Fig. 16  Fig. 17
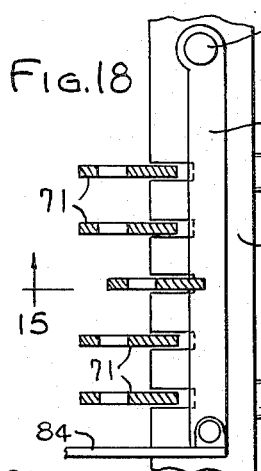
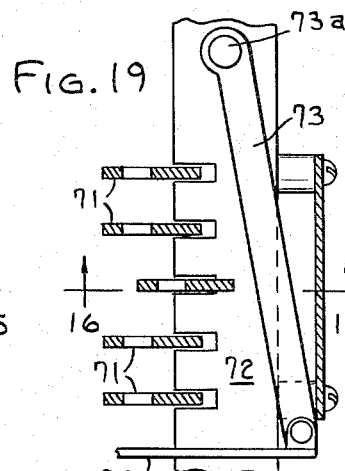
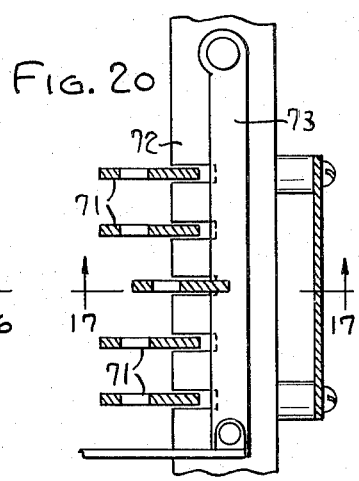
Fig. 18  Fig. 19  Fig. 20
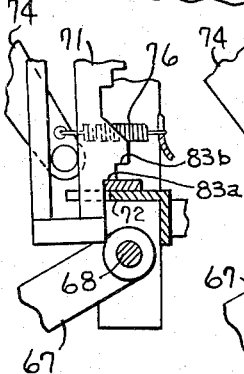
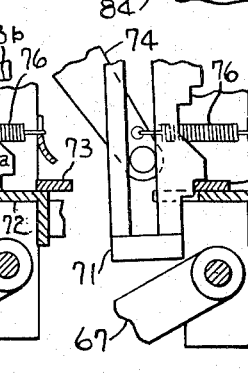
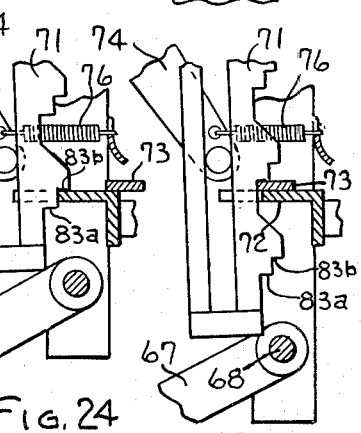
Fig. 21  Fig. 22  Fig. 23  Fig. 24  Fig. 25
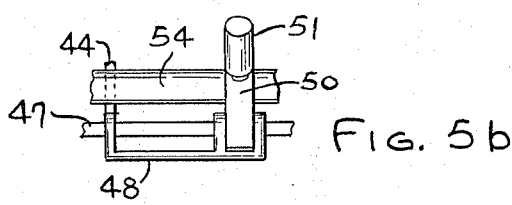
Fig. 5b

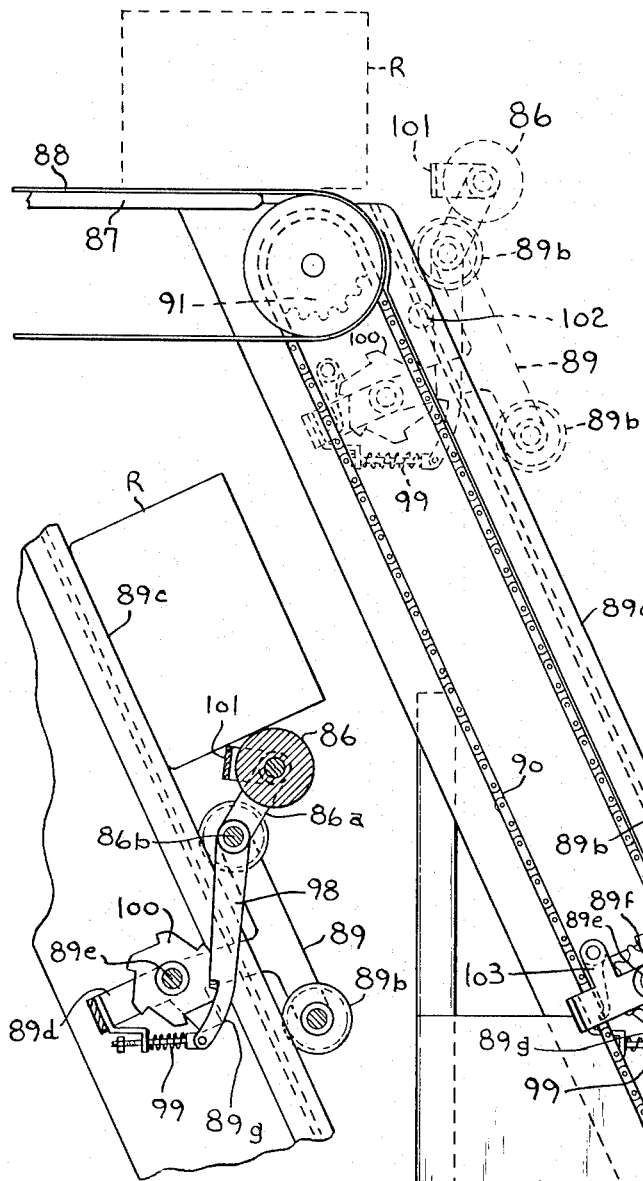
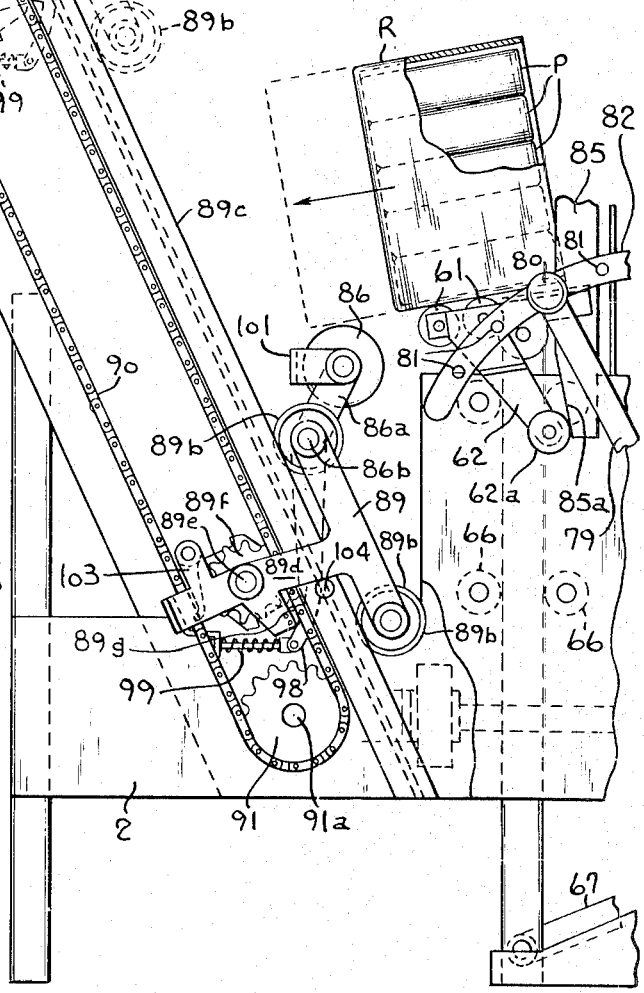
FIG. 28
FIG. 29
INVENTORS
Julius Jorgensen
Arnold R. Buchholz
BY
Quarles & French
Att'ys.

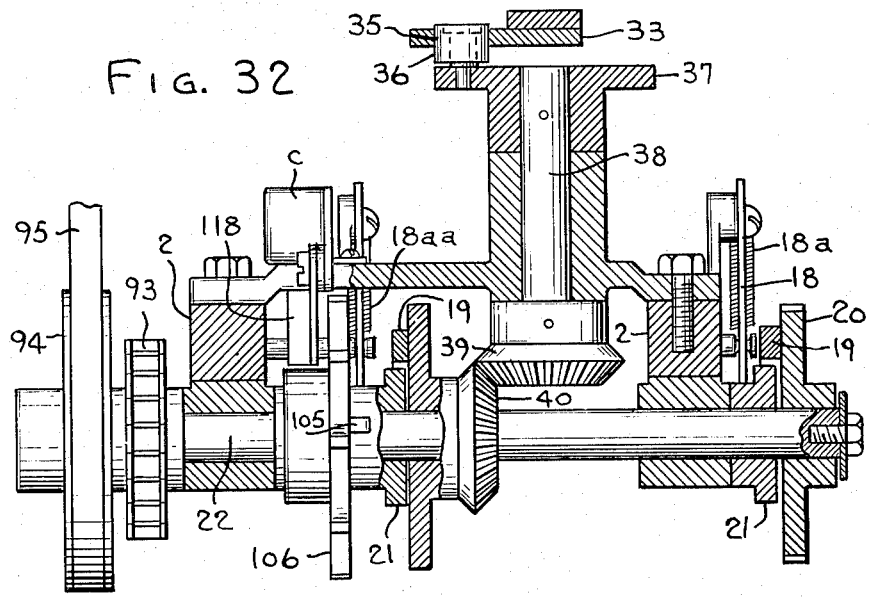
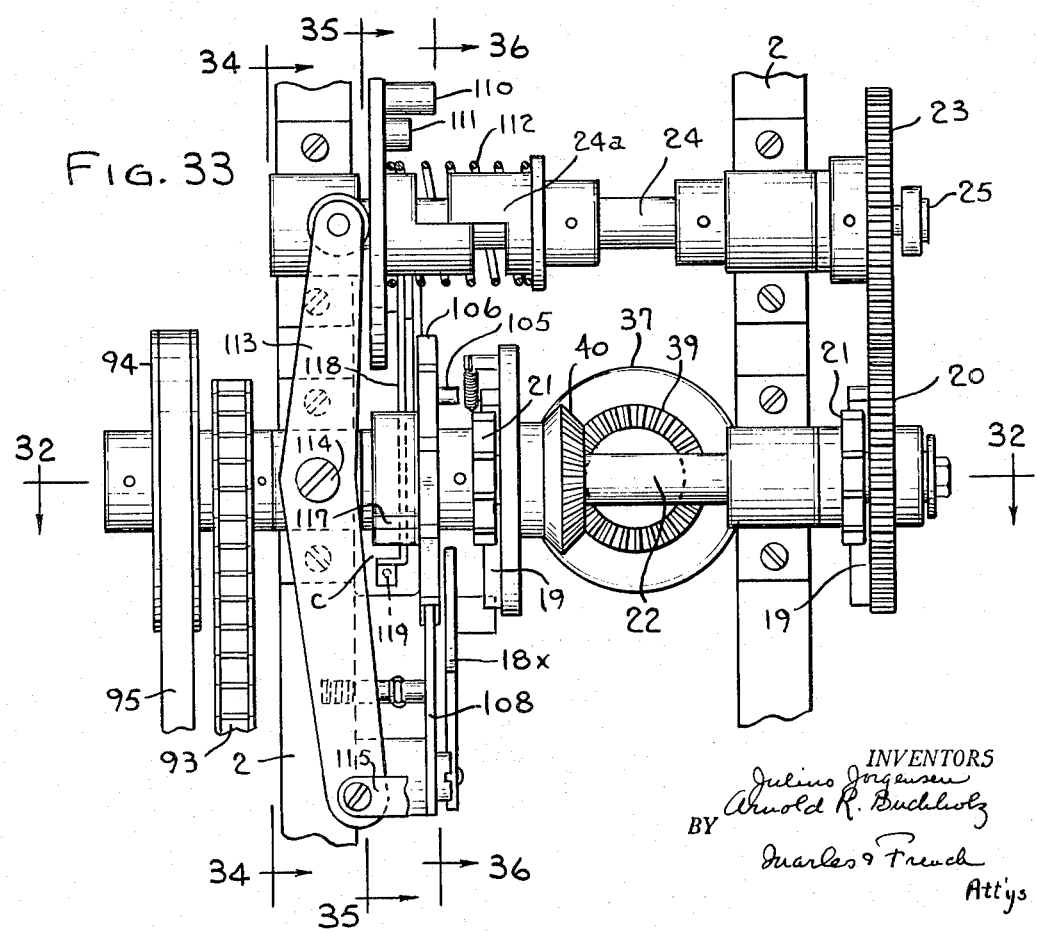

INVENTORS
Julius Jorgensen
Arnold R. Buchholz
BY Charles & French
Att'ys.

May 1, 1956 J. JORGENSEN ET AL 2,743,563
RECEPTACLE LOADER
Filed July 13, 1953 14 Sheets-Sheet 14

INVENTORS
Julius Jorgensen
Arnold R. Buckholz
BY
Charles & French
Attys.

United States Patent Office 2,743,563
Patented May 1, 1956

2,743,563

RECEPTACLE LOADER

Julius Jorgensen, Detroit, Mich., and Arnold R. Buchholz, Watertown, Wis., assignors to Brandt Automatic Cashier Company, Watertown, Wis., a corporation of Wisconsin Application July 13, 1953, Serial No. 367,503

11 Claims. (Cl. 53—160)

The invention relates to a machine for filling portable receptacles with packages of coins.

The main object of the invention is to provide a machine for filling boxes or other receptacles of different sizes or cubical content with packages of coins of different denominations and sizes. The machine has various constructional features hereinafter described which permit the loading of packages of coins of different denominations into different size receptacles in layers and columns.

The invention further consists in the several features hereinafter described and more particularly defined by claims at the conclusion hereof.

In the drawings:

Fig. 5 is a top plan view of the machine, the receptacle being shown in section;

Fig. 5B is a detailed vertical sectional view taken on the line 5B—5B of Fig. 5;

Fig. 6 is a detailed vertical sectional view taken on the line 6—6 of Fig. 3;

Fig. 7 is a wiring diagram;

Fig. 11 is a detailed vertical sectional view taken on the line 11—11 of Fig. 4;

Fig. 13 is a detailed vertical sectional view taken on the line 13—13 of Fig. 3;

Fig. 14 is a detailed vertical sectional view taken on the line 14—14 of Fig. 13;

Figure 1:
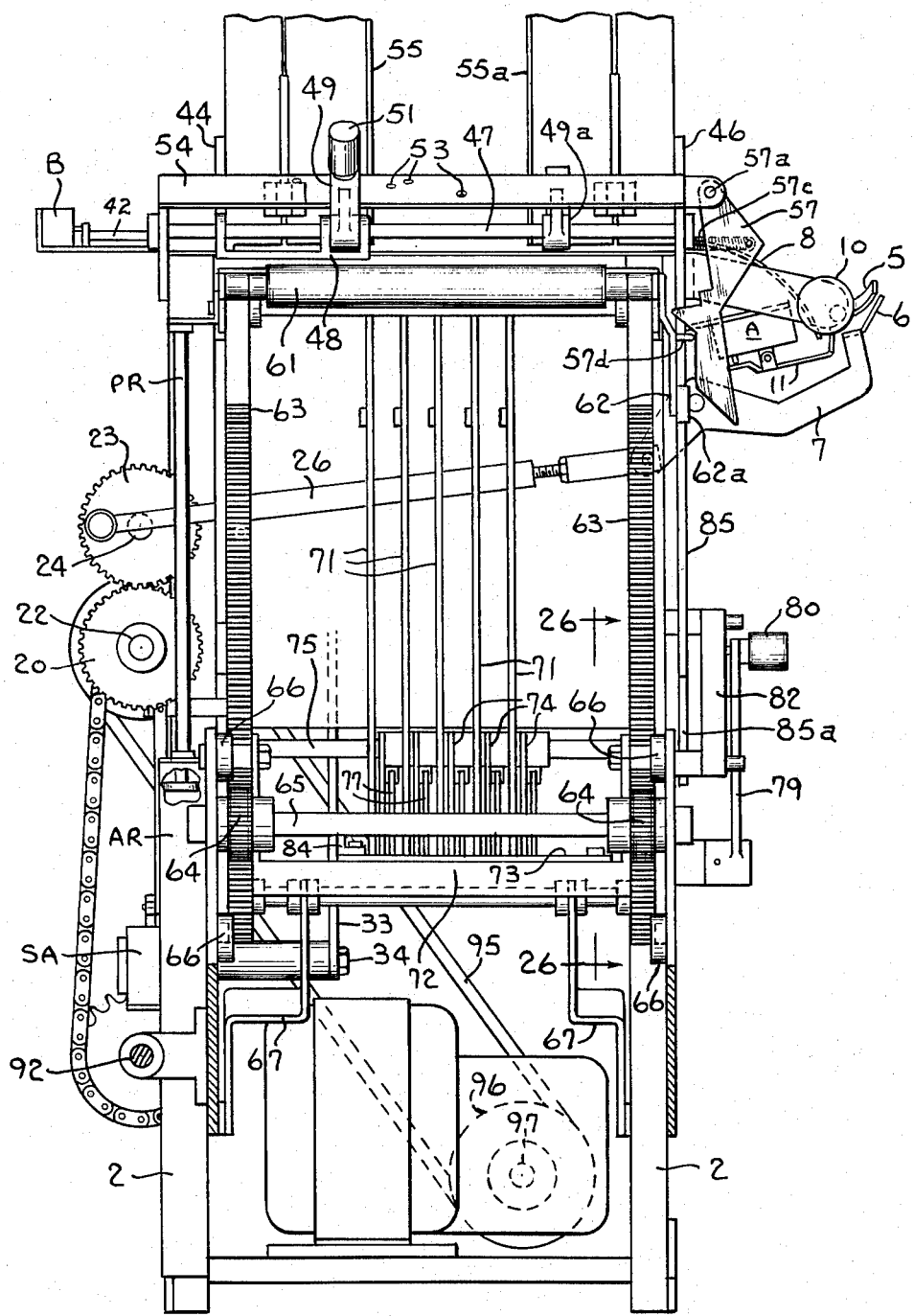
Fig. 1 is a front elevation view of a machine embodying the invention, the elevator being omitted.
Figure 2:
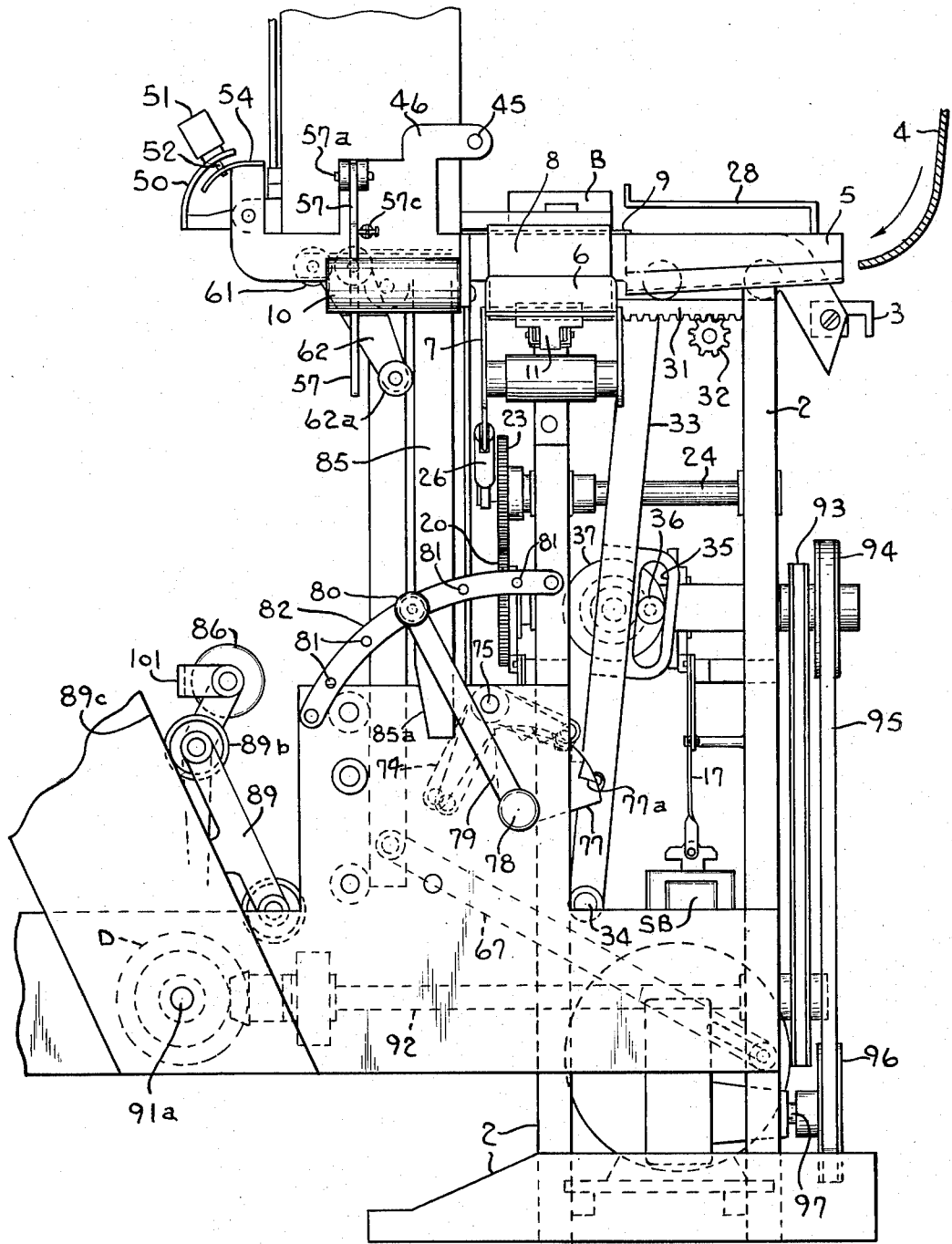
Fig. 2 is an elevation view of the right side of the machine, parts being broken away.
Figure 3:
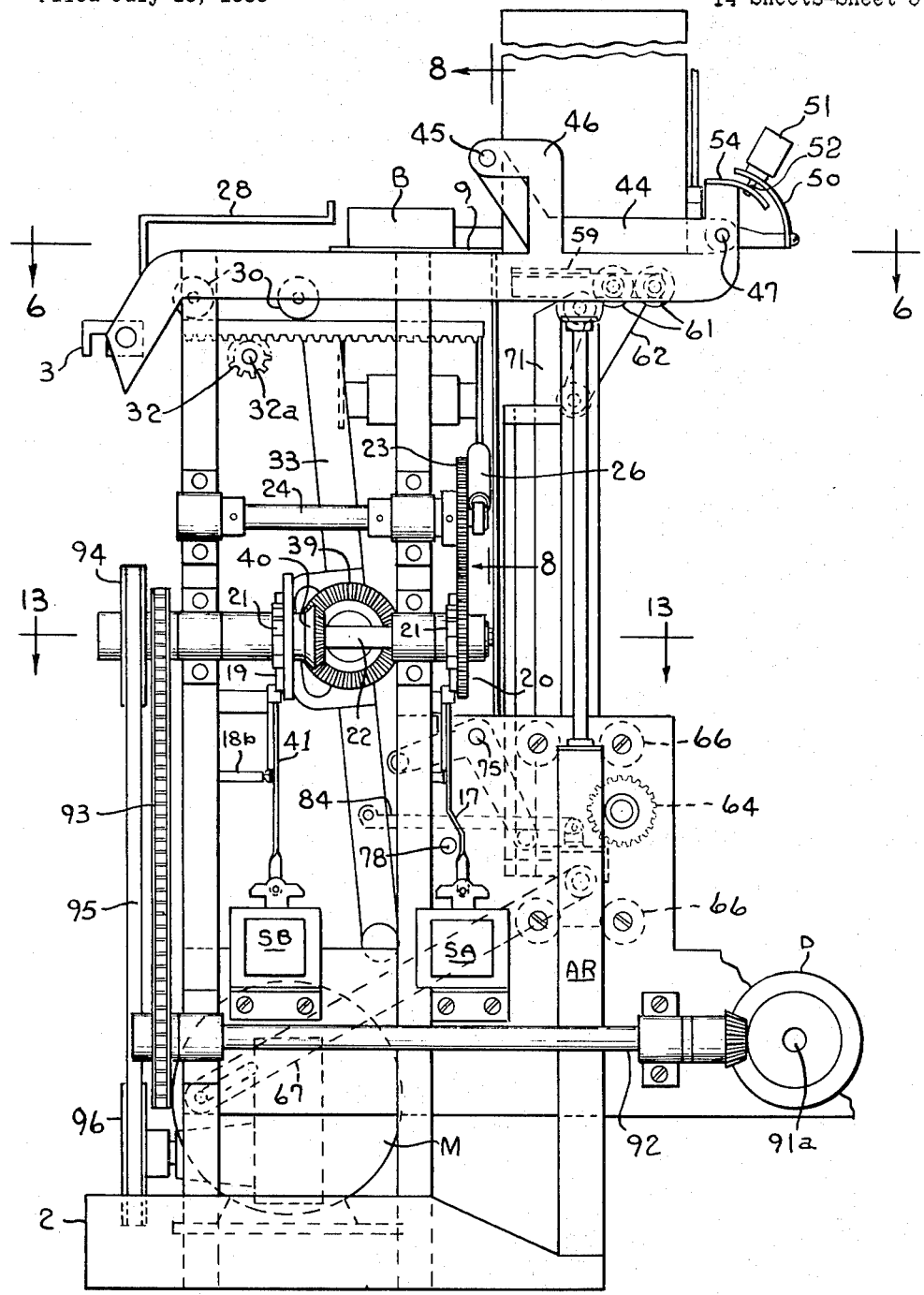
Fig. 3 is a view similar to Fig. 2 showing the left side of the machine.
Figure 4:
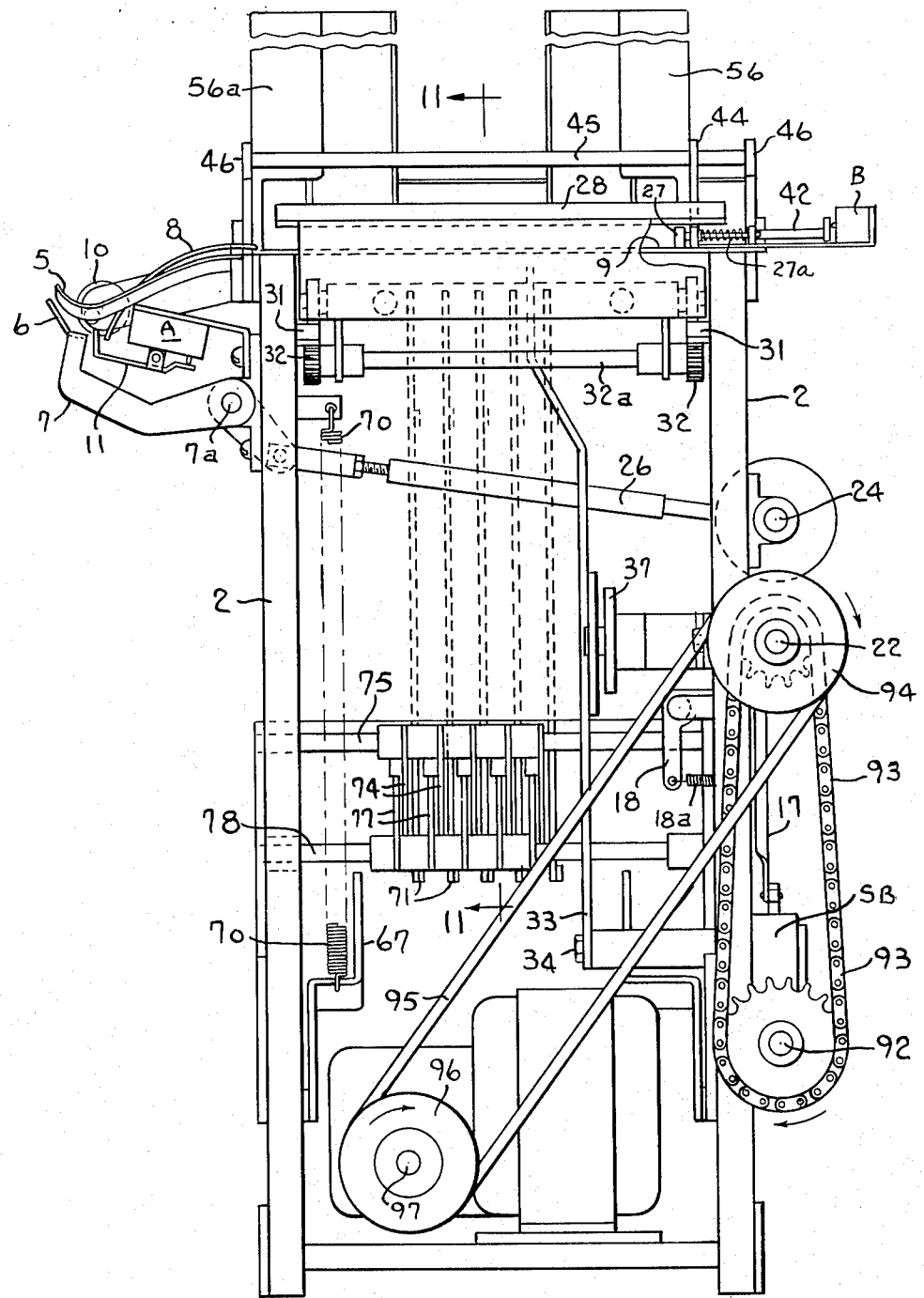
Fig. 4 is a rear elevation view of the machine.
Figure 8:
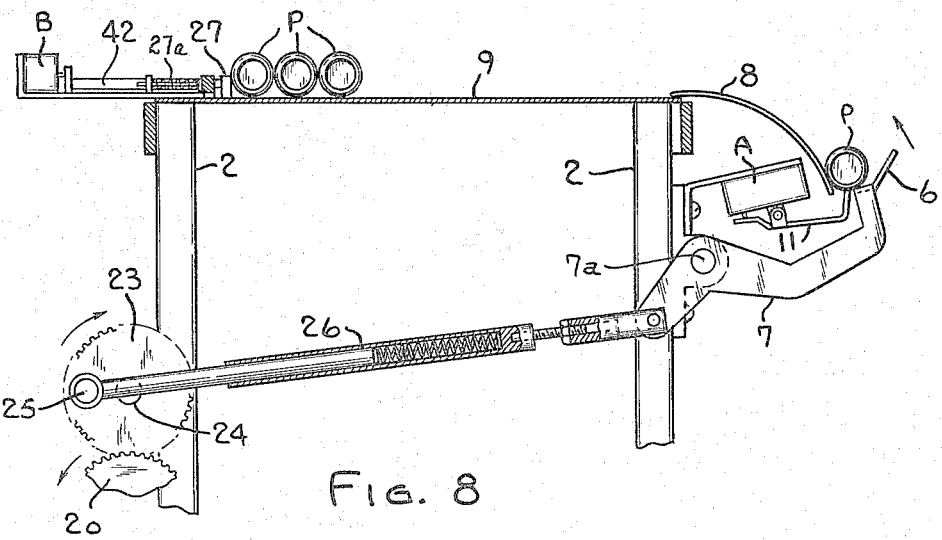
Fig. 8 is a detailed vertical sectional view taken along the line 8—8 of Fig. 3, showing the parts in one position.
Figure 9:
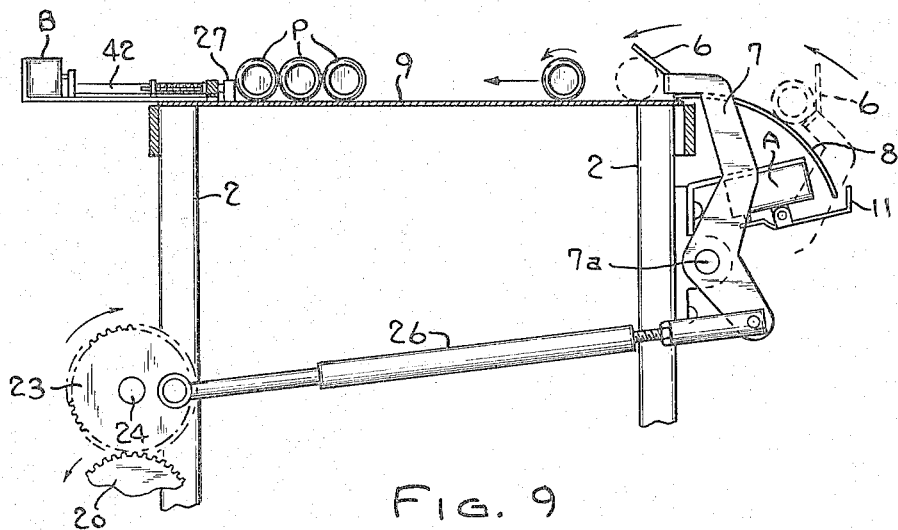
Fig. 9 is a view similar to Fig. 8 showing the parts in another position.
Figure 10:
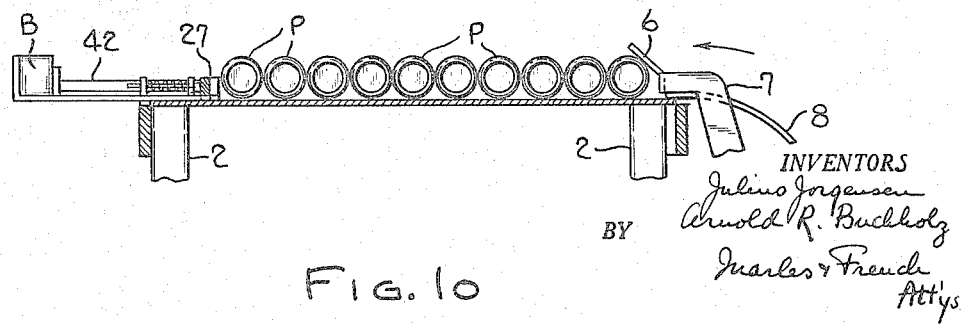
Fig. 10 is a view similar to Fig. 9 showing the completion of the feeding of a layer of coin packages onto a receiving platform or table prior to the insertion of this layer into a receptacle.
Figure 31:
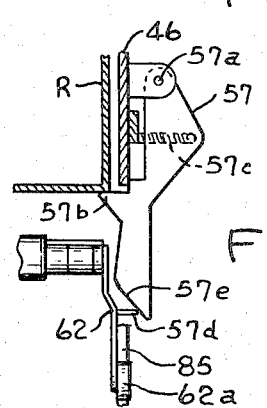
Figures 26, 27:
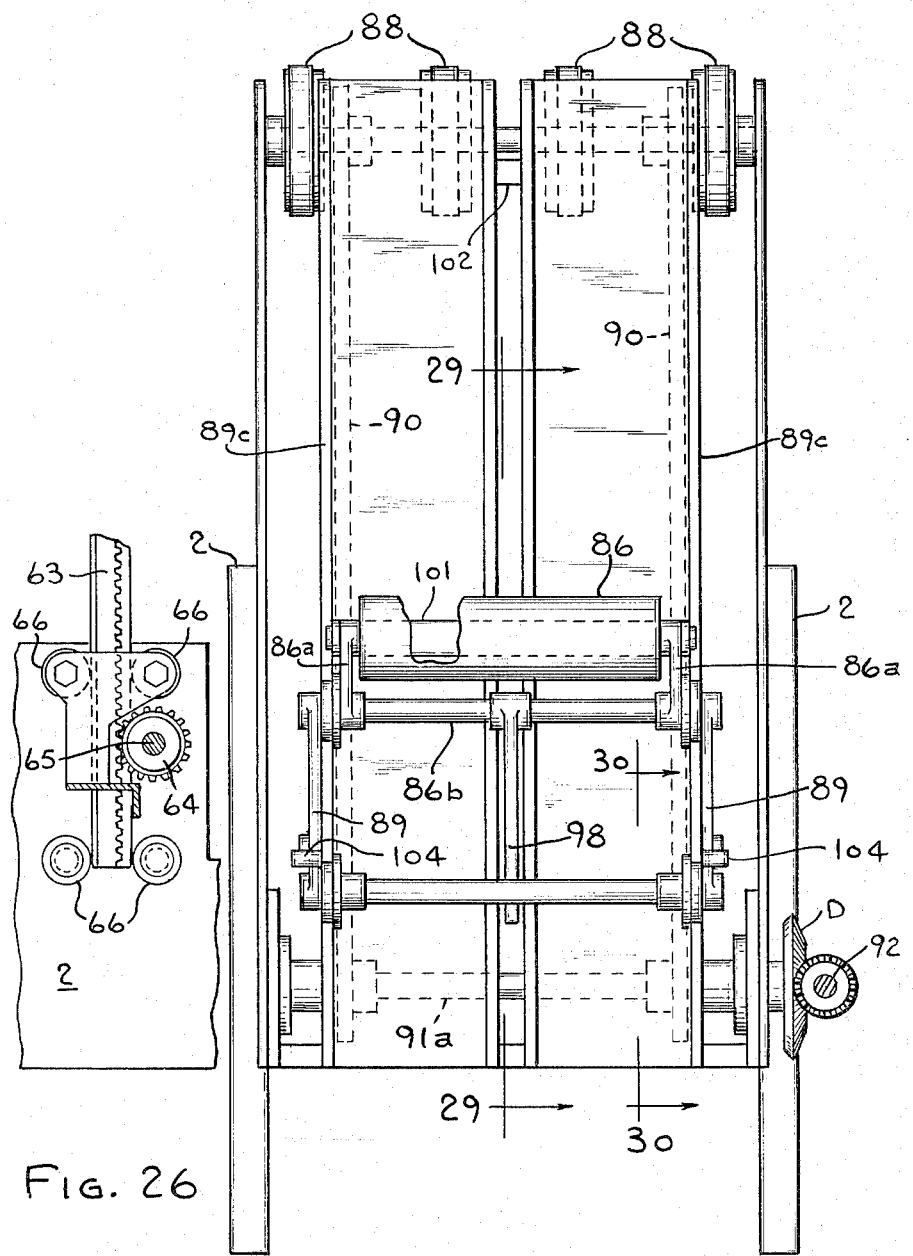
Figure 34:
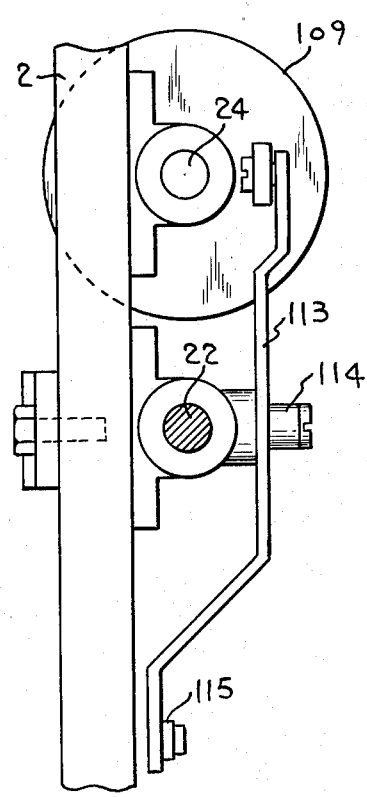
Figure 35:
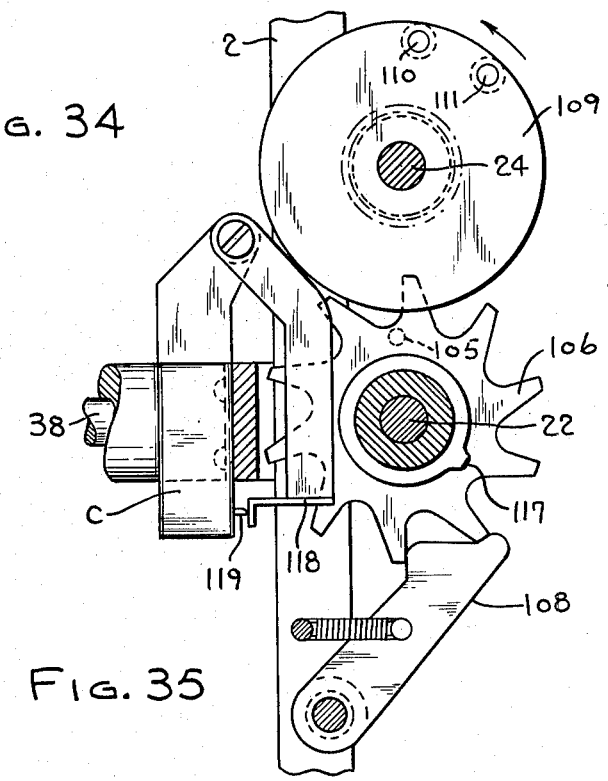
Figure 36:
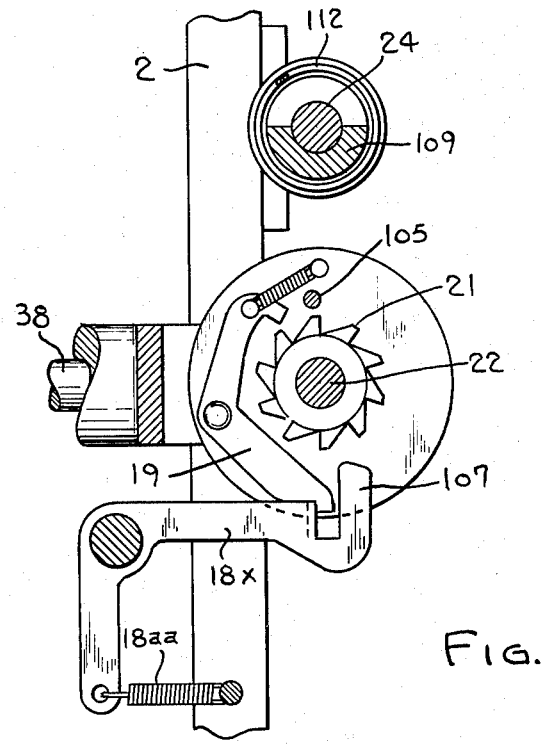
Figure 40:
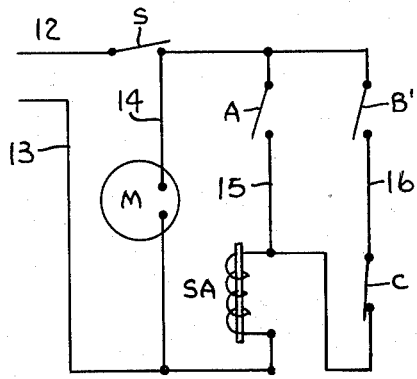
Figure 37:
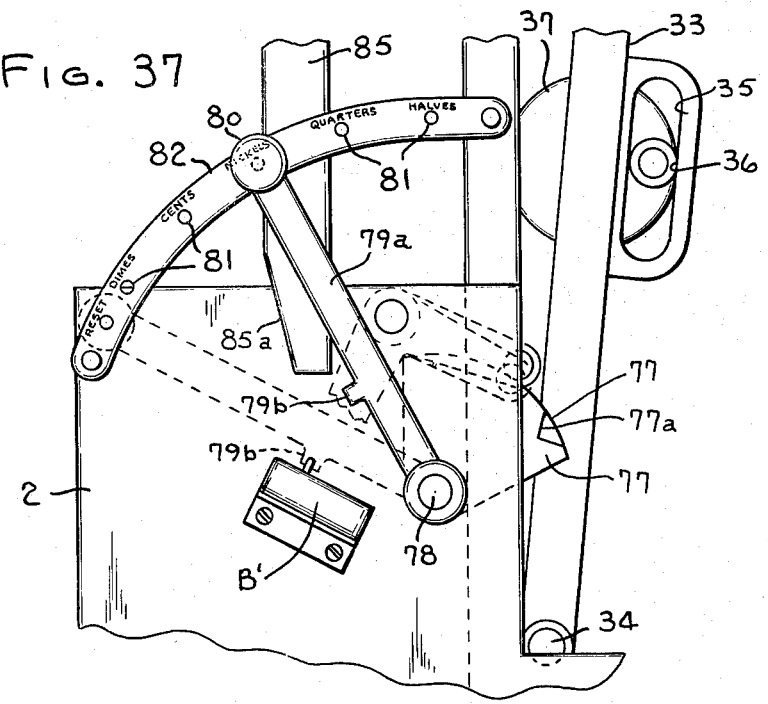
Figure 38:
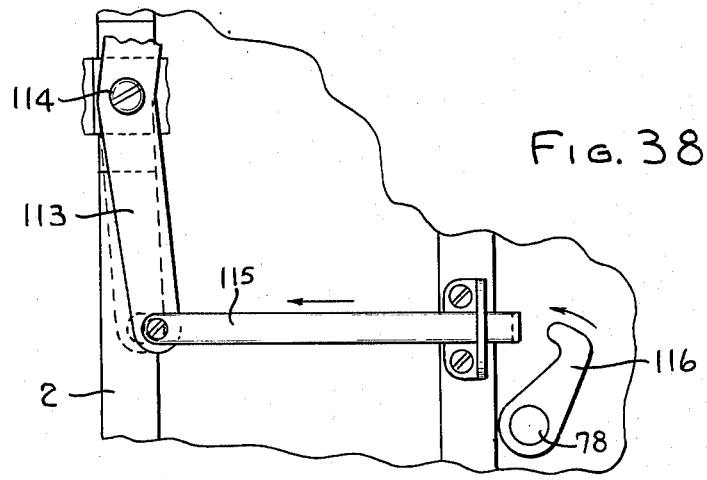
Figure 39:
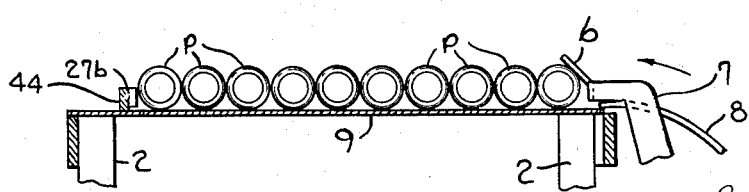

Figs. 15, 16, and 17 are detailed vertical sectional views of parts shown in Fig. 11 showing them in different positions;

Fig. 18 is a detailed vertical sectional view taken on the line 18—18 of Fig. 15;

Fig. 19 is a detailed vertical sectional view taken on line 19—19 of Fig. 16;

Fig. 20 is a detailed vertical sectional view taken on the line 20—20 of Fig. 17;

Figs. 21 to 25 are views similar to Figs. 18 to 20 showing the rack for the half dollar package in different operating positions;

Fig. 26 is a detailed vertical sectional view taken on the line 26—26 of Fig. 1;

Fig. 27 is a front elevation view of the elevator mechanism;

Fig. 28 is a side view of the elevator mechanism;

Fig. 29 is a detailed vertical sectional view taken on the line 29—29 of Fig. 27;

Fig. 30 is a detailed vertical sectional view taken on the line 30—30 of Fig. 27;

Fig. 30a is a detailed vertical sectional view taken on the line 30a—30a of Fig. 30;

Fig. 31 is a detailed vertical sectional view of parts shown in Fig. 1;

Fig. 32 is a horizontal sectional view, similar to Fig. 13 and taken on the line 32—32 of Fig. 33 showing certain modifications;

Fig. 33 is a side elevation view similar to Fig. 3, parts being broken away showing the modification above referred to;

Fig. 34 is a detailed vertical sectional view taken on the line 34—34 of Fig. 33;

Fig. 35 is a detailed vertical sectional view taken on the line 35—35 of Fig. 33;

Fig. 36 is a detailed vertical sectional view taken on the line 36—36 of Fig. 33;

Fig. 37 is a detailed elevation view showing modifications in the setting control associated with parts shown in Fig. 2;

Fig. 38 is an elevation view of parts on the opposite side of the machine from that shown in Fig. 37;

Fig. 39 is a vertical sectional view similar to Fig. 10 showing certain modifications;

Fig. 40 is a wiring diagram for the modified construction.

Referring to the drawings, the machine includes a frame 2 which is adapted to be placed in front of a coin packaging machine and be held in position by catches 3 engaging a part of said machine so that packaged coins from a discharge chute 4 of said packaging machine (see Fig. 2) will fall by gravity into a short guide chute 5 and then slide along into a temporary chute formed by the transversely extending upper bar end 6 of a feeder lever or pusher member 7 and a curved plate 8 whose upper part connects with a horizontally disposed receiving platform or table 9 (see Figs. 1, 4, 8 to 10). The package delivered to the temporary chute is arrested by a fixed stop 10, Figs. 1 and 5. A pivotally supported switch operating lever 11 has one of its arms normally projecting up into the open bottom of the temporary chute so that as a package of coins is delivered to this chute, its weight will depress this switch arm to close a switch A in the circuit shown in Fig. 7 which includes supply lines 12 and 13 having a start and stop switch S therein and parallel circuit conductors 14, 15, and 16. An electric drive motor M is supplied with current from the conductor 14. The coil of a solenoid SA is supplied with current from the conductor 15 which includes the switch A. The coil of a solenoid SB is supplied with current from the conductor 16 which includes a switch B.

Solenoid SA (Fig. 3) has its plunger connected by a link 17 (Fig. 14) with a spring urged pivoted latch 18 that normally acts to hold a spring urged clutch dog 19 pivotally mounted intermediate its ends on a gear 20 out of engagement with a ratchet wheel 21 fast to a continuously rotating drive shaft 22 (Fig. 13). Closure of switch A energizes solenoid SA which through link 17 moves latch 18 to its dotted line release position so that dog 19 may swing into engagement with ratchet 21 and rotate the gear 20, normally loose on shaft 22, through a single revolution which is determined by the resetting of the latch 18 by its spring 18a, anchored on a pin 18b, on the opening of switch A. Gear 20 meshes with a gear 23 on a shaft 24 journalled in the machine (Fig. 3) carrying a crank pin 25 operatively connected by a connecting rod 26 (Figs. 1, 14, 8 to 10) with the lower arm of feed lever 7 pivoted intermediate its ends at 7a to the machine frame so that rotation of gear 20 will swing lever 7 from the position shown in Fig. 8 to the position shown in Figs. 9 or 10. As the upper end 6 of lever 7 swings upward, it pushes the coin package P over the curved plate 8 and discharges package P onto the table 9 with sufficient momentum so that it can roll along this table until the first package hits an adjustable stop 27. As soon as lever 7 lifts package P from engagement with switch lever 11, switch A opens allowing latch 18 to be reset as previously noted and gear 20 continues to revolve until the clutch dog 19 again comes to the initial position shown in Fig. 14. Thus the feed mechanism above described operates to deliver packages of coins, one at a time, received from the coin packaging machine onto and across the table 9 until a predetermined number of packages determined in the first form shown by the adjustment of the stop 27 are received. The number of coin packages of pennies, nickels, dimes, and quarters may be ten and the length of the receptacle R such as to accommodate this number as a single layer. The number of half dollar coin packages may be five and the length of the receptacle such as to accommodate this number as a part of a single layer. The depth of the receptacle may be equal to the length of a coin package for pennies, nickels, dimes, and quarters and equal to double the length of a half-dollar coin package.

The receptacles R are adapted to be arranged in a stack adjacent the table 9 so that one of these is in a position to receive a row or layer of coins of any one denomination when this row is pushed as a unit into said receptacle by a reciprocatory pusher member 28 (Figs. 3, 4, 5, and 11) which is connected to a reciprocatory carriage 29 having rollers 30 riding on rails forming the tops of fixed racks 31 which are engaged by gears 32 underslung from the carriage and mounted on a shaft 32a. Carriage 29 is reciprocated by a lever 33 operatively connected at its upper end to said carriage and pivotally connected at its lower end 34 to the frame and having a slot 35 intermediate its ends in which a roller crank pin 36 works, said pin being mounted on a crank disk 37 on a shaft 38 (Fig. 13) carrying a bevel gear 39 meshing with a bevel gear 40 loose on the shaft 22 but adapted to be connected in driven relation thereto by a one revolution clutch identical with that previously described so that the same numerals are applied to similar parts in Fig. 13 and the latch of which clutch is controlled and operated through a link connection 41 with the plunger of the solenoid SB. Solenoid SB is energized on the closure of swiltch B which is operated by a push rod 42 that is connected with the stop 27, so that as the last of the predetermined number of coin packages is received on the table 9, the stop 27 and rod 42 will move from the position shown in Fig. 9 to the switch B closing position shown in Fig. 10, so that the clutch for gear 40 will be engaged to rotate shaft 38 through a single revolution and thus swing lever 33 back and forth and move carriage 29 with pusher 28 first inwardly toward the receptacle R to push a row of coins into the boxes and then outwardly to its initial position, the opening of switch B occurring as soon as the coins are released from the stop 27. Thus for packages of pennies, nickels, dimes, and quarters a single operation of the pusher 28 delivers a single tier or layer of packages to the receptacle while for the half dollar two operations of the pusher, delivering five packages of coins for each operation, delivers a single tier or layer of packages to the receptacle. The stop 27 and rod 42 are normally urged to a switch open position by springs 27a which resist movement of the stop 27 by the coin packages until the feeder 7 engaging the last fed package of a row puts enough pressure on the row to overcome the loadings of these springs and move rod 42 to close switch B.

Figure 5A:
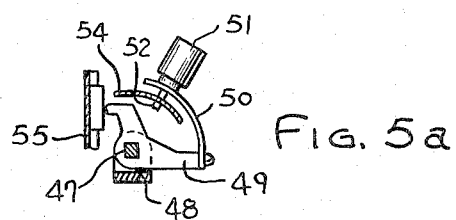
Fig. 5A is a detailed vertical sectional view taken on the line 5A—5A of Fig. 5.

Since the widths of coin packages of different denominations vary and the sizes of the receptacles correspondingly vary, mechanism shown in Figs. 5, 5A, and 5B is provided for adjusting the position of the stop 27 and its associated parts and that of a guide means for the receptacles. A base plate 43 for the stop and switch B is carried on a support 44 slidably mounted intermediate its ends on a rod 45 mounted in brackets 46 on frame 2. The outer end of support 44 is mounted to slide loosely on a square shaft 47 and is connected (Fig. 5B) to a slider 48 on said shaft 47 so that lengthwise movement of said slider will move the stop 27, rod 42, and switch B lengthwise of the table. The shaft 47 has a finger 49a fixed thereto, and a similar finger 49 forms a part of the slider 48 which has a curved arm extension 50 carrying a handle 51 that is provided with a releasable detent 52 that may be engaged in any one of a series of holes 53 in a curved plate 54 fixed to the brackets 46. The fingers 49 and 49a are adapted to engage parts of plates 55 and 55a, respectively hingedly connected to the support 44 and one of the fixed brackets 46 so as to swing said plates into engagement with the bottom of receptacle R on the angular movement of shaft 47 and hold its front edge in engagement with angled brackets 56 and 56a secured respectively to the support 44 and one of the brackets 46, the plates actually being hinged to said brackets as shown in Fig. 5. Since the plate 55 and the bracket 56 are connected to the support 44, adjustment of the support 44 by the lengthwise movement of the slider 48 will adjust the receptacle guide parts to the length of the receptacle and oscillation or swinging of the slider 48 to its desired denominational setting position determined by the marked holes 53 in Fig. 5 will swing the plates 55 and 55a into a position to cooperate with the brackets 56 and 56a to accommodate the width or depth of the receptacle R and position it between these parts.

The receptacle positioning means noted above do not actually hold the receptacles against movement but guide them as the stack of receptacles is lowered as hereinafter described. However, the empty receptacles are temporarily held against vertical movement by a stop latch 57 that is pivotally mounted at 57a on the rear bracket 46 (Fig. 5) and has a stop shoulder 57b urged by a spring 57c into a position beneath the lowermost of the stack of empty receptacles as shown in Fig. 31 and which is released by a cam 57d mounted on an arm 62 of a receptacle carrying means or platform including a plate 59, Figs. 2, 11, and 12, it being noted that the latch 57 is used to hold the empty receptacles while the loaded receptacle descends with the platform. Cam 57d engages a cam surface 57e on the latch during the upward movement of the platform to move the latch to its release position as shown in Fig. 1 clear of the adjacent side of the receptacle when the platform is in a receptacle loading position which as shown in Fig. 11 is actually higher than when the empty receptacles are held by the latch 57.

The plate 59 forms part of a tiltable platform pivotally mounted on a cross rod 60 and provided with spaced rollers 61 and a roller carrying arm 62 extending below said rod 60. The rod 60 is supported at its opposite ends on vertically disposed spaced rack bars 63, Figs. 1 and 26, that engage spaced stabilizer pinions 64 mounted on a shaft 65 journalled on frame 2 and also engages spaced sets of guide rollers 66. The carrying means above described constitutes a receptacle lowering elevator which is normally moved to its upper position by a pair of spaced levers 67 pivotally connected at one of their ends to a cross shaft 68 connecting the rack bars 63 together and having a lost motion pivot connection 69 at their other ends with frame 2, said levers being normally urged by tension springs 70 to their upper position and being with the bars 63 and the other receptacle supporting parts moved downwardly by the weight of the coin packages in the receptacle being filled.

Figure 12:
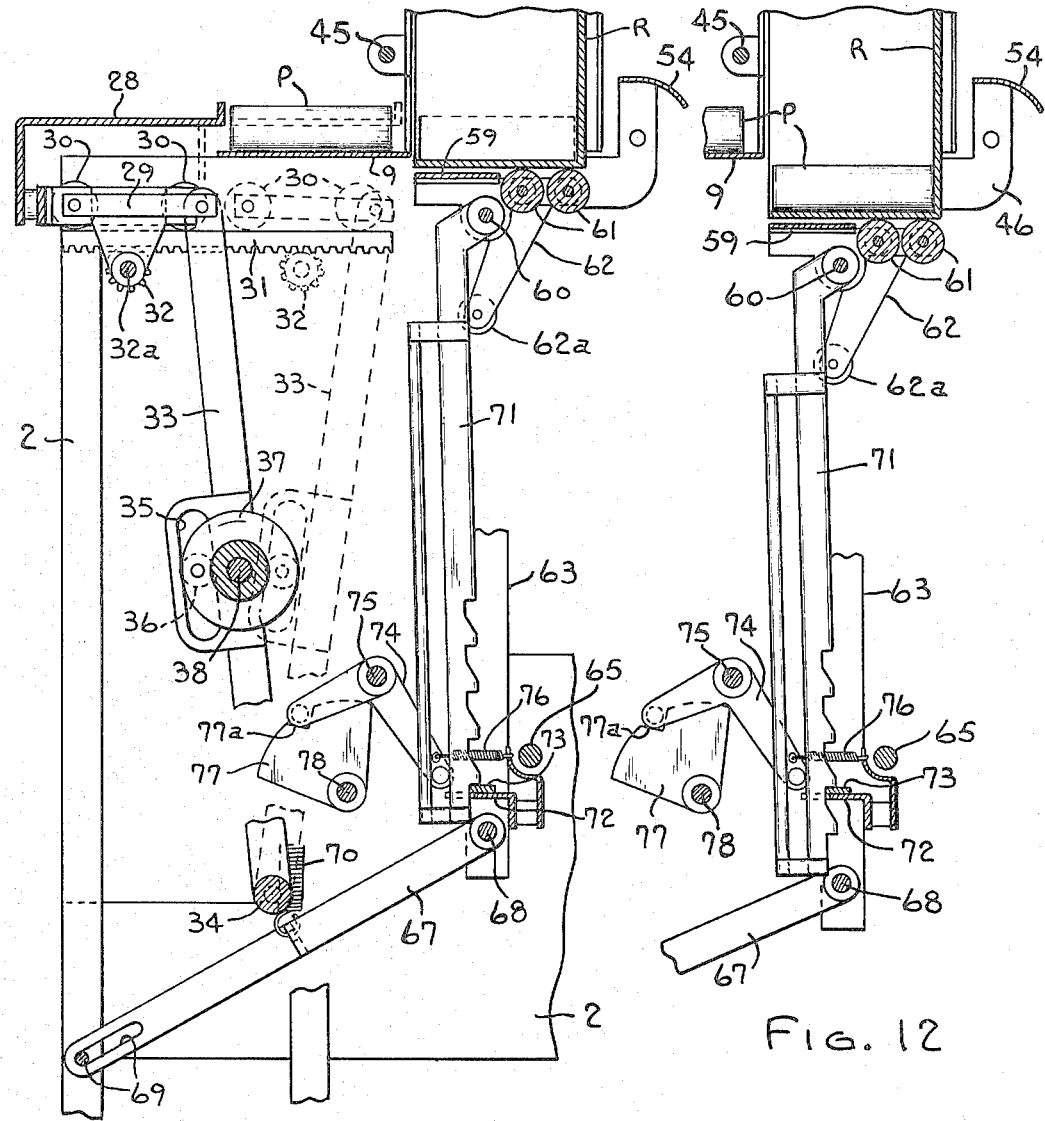
Fig. 12 is a view of parts shown in Fig. 11 showing in a different position.

Progressive lowering of the platform for each denomination of coins is determined by a series of selectible toothed stop bars 71 acting in selective conjunction with a fixed stop member 72 and a movable stop member 73, Figs. 11 and 12. All the stop bars 71 are pivotally supported on the cross rod 60 at their upper ends, and each is slotted to receive one of the pin ends of one of a series of settable levers 74 mounted on a pivot rod 75 and normally urged by a spring 76 to bring its other pin end into engagement with its cooperative settable notched segment 77 mounted on a settable shaft 78 journalled in frame 2. Shaft 78 (Figs. 1 and 2) has a hand control crank 79 provided with a releasable detent 80 adapted to be engaged in one of a series of holes 81 in a fixed segment plate 82 for setting said shaft and its segments 77 into different angular positions to accommodate the particular denomination of coin package being handled. The notches 77a of the segments or cams 77 are angularly displaced relative to each other so that only one of these segments and its associated lever 74 is active at a time. By this construction the setting of one of the levers 74 moves its associated stop bar 71 into a position so that its teeth will cooperate with the stop members 72 and 73 to hold the lowering elevator or platform in different positions and hence the receptacles in different vertical positions until the receptacle is filled, tier by tier, with coin packages.

Referring to Figs. 15 to 25, the stop bars 71 for the pennies, nickels, dimes, and quarters have teeth with a single shoulder 83 while that for the half dollars have teeth or stop shoulders 83a and 83b so as to permit the feeding in of two sets or rows of half dollar packages for a single tier on successive operations of the movable stop member 73. The movable stop member 73 is a lever pivoted on frame 2 at 73a and operatively connected by a link 84 (Fig. 3) with the oscillatory lever 33 so that each time the carriage 29 moves forward or toward the receptacle to be filled, the stop member 73 is moved from the position shown in Figs. 15, 18, 21, or 23 to the position shown in Figs. 16, 19, 22, or 24 so that the selectively positioned stop bar 71 may drop down to a position in which its shoulder 83 or one of the shoulders 83a or 83b is engaged with the fixed stop member 72. Then as the pusher mechanism including lever 33 moves back or toward the left as viewed in Figs. 16, 19, the member 73 will move from the position shown in Figs. 16, 19, 22, and 24 to a position to engage the front end of a tooth of the stop bar 71 and push it off of the fixed stop 72 so that this bar and the parts including the plate 59 may drop with the receptacle a distance of one tooth as shown in Fig. 17 or a part of a tooth as shown in Fig. 24 or the rest of the tooth as shown in Fig. 25, and then be in a position to engage the stop shoulder of the next tooth or the first shoulder 83a of said tooth. There being five stop shoulders on each of the bars 71 for the pennies, nickels, quarters, and a similar number with additional shoulders for repetitive operation for the half dollar, the receptacle for each of these denominations will be filled with five tiers of each of the above denominations. There are ten stop shoulders (not specifically shown) for the stop bar 71 for the dimes so that there will be ten tiers of dimes per receptacle. After the carrying means above described is released by the release from the last stop shoulder of the bar 71, the receptacle drops down from a greater or less height, depending upon the receptacle size, the dime receptacle being the largest receptacle to a position where it may be tilted forwardly as hereinafter described. Air cylinders AR whose pistons PR, Figs. 1 and 3, are connected at their upper end with the lowering platform cushion the shock of descent of the loaded receptacle and also retard sudden upward motion of the table when the load is removed.

During the descent of the carrier including plate 59 and roller 61, the roller 62a of the arm 62 rides on the flat vertical face of a cam bar 85 which at its lower end has a bevelled face 85a which when the receptacle drops down is engaged by roller 62a permitting the platform formed by said plate and said rollers under the action of weight of the loaded receptacle R to tilt forwardly or toward the left as viewed in Fig. 2 about the pivot 60 as shown more particularly in Fig. 28 so that the overbalanced receptacle may slide over the tops of the rollers 61 onto a roller 86 as shown in dotted in Fig. 28 and then over said roller to the position shown in Fig. 29.

Referring to Figs. 2 and 27 to 29, the roller 86 forms a part of an elevator mechanism for raising the filled receptacles to a table, and as here shown, to a belt conveyor 88 running on this table which is at a height within ready reach of an operator. Roller 86 is mounted on arms 86a fast to a shaft 86b pivotally mounted on a carriage 89 provided with rollers 89b running on inclined rails 89c, said carriage having depending arms 89d carrying a shaft 89e provided with spaced pinions 89f meshing with the links on the upper run of spaced chains 90 running over spaced sets of sprocket 91. The chains 90 are continuously driven by a bevel gear, Figs. 3, 4, and 27, drive connection D between the shaft 91a for the lower sprocket and a shaft 92 connected by a chain and sprocket drive connection D between the shaft 91a for the lower sprocket and a shaft 92 connected by a chain and sprocket drive connection 93 with the shaft 22 which carries a pulley 94 connected by a belt 95 with a pulley 96 on the motor driven shaft 97. Thus the chains 90 and the pinions 89f are continuously rotated by the motor M as is also the shaft 22 previously referred to, but the carriage 89 does not move until it is coupled to the chains 90. Shoes 89g mounted on extensions of the arms 89d prevent the chain 90 from jumping off the pinions 89f.

For automatically coupling the carriage 89 to chains 90, as a filled receptacle R (Figs. 28 and 29) is delivered to the elevator, a dog 98 secured to the pivot shaft 86b is adapted under the weight of the receptacle acting through the arms 86a on shaft 86b to be moved against its opening spring 99 into engagement with a ratchet wheel 100 on the shaft 89e so that this shaft and pinions 89f are locked against free rotation and hence must move upwardly with the inner run of the chains 90 to bring the carriage to its upper dotted line position shown in Fig. 28. As it reaches this position, the filled receptacle's front edge is moved off the rails 89c so that this edge can tip down onto the conveyor 88 and permit the rear portion of the receptacle to slide off of the roller 86 which then under the action of the spring 99 moves back to its initial position, and at the same time the dog 98 is released from the ratchet wheel 100.

In addition to the weight of the filled receptacle acting to release this receptacle from the carriage, there is a U-shaped bar 101 that is secured to shaft carrying roller 86 so that its transverse portion projects forwardly, and as the carriage 89 reaches its upper position, and the receptacle drops down onto the conveyor 88, this bar 101 gives the receptacle a forward push as it leaves the carriage, this push being made positive by the engagement of a cam or stop rod 102 with the dog 98 as shown in dotted lines in Fig. 28 which acts to swing the arms 86a and bar 101 toward the left as the carriage completes its upper movement.

After discharge of the filled receptacle, the carriage is carried by the chains to its initial position by coupling it to the outer or lowering run of the chains 90 by means of a spring urged dog 103 which is pivotally mounted on the arms 89d so that it will engage with one of the links of the chain 90 (Fig. 30) to move the carriage down with the chain but will be free to trip over these links on the upward movement of the carriage. In its lowered position the carriage 89 is stopped by its engagement with a stop rod 104, Figs. 28 and 30.

Instead of providing the yieldable stop 27 and the switch B controlled thereby and indicated in Fig. 10, a fixed stop 27b shown in Fig. 39 may be used and in place of the switch B and the solenoid SB for controlling the one revolution clutch that connects the pusher member 28 with the drive shaft 22 through the parts previously described, the one revolution clutch may be mechanically controlled by a predetermined count mechanism, and this modification, shown in Figs. 32 to 40 inclusive, will now be described.

Comparing Fig. 13 with Fig. 32, it will be noted that these constructions are the same except that the one way clutch mechanism coupling the gear 40 to the shaft 22 instead of being released by the solenoid operated lever or latch 18, Fig. 14, is released by releasing a lever or latch 18x (Fig. 36) that is normally moved by a spring 18aa, similar to the spring 18a, into locked position with the dog 19. Latch 18x is released by engagement of a pin 105 mounted on a timing gear 106 moving into engagement with the bevelled extended end 107 of said latch. The hub of gear 106 is loosely mounted on the shaft 22 and has a spring urged pivotally mounted holding pawl 108 engageable with its teeth to permit a step by step progressive rotation. Gear 106 is advanced either one tooth or two teeth at a time by a drive member 109 which is slidably keyed to the shaft 24 by the half collar 24a fixed to shaft 24 and a half collar formed as a part of the hub of member 109. Member 109 carries a long pin 110 and a shorter pin 111, each of these pins adapted when properly positioned relative to the gear 106 to advance the gear 106 one tooth. The gear 106 has ten teeth so that when member 109 is positioned as shown in Fig. 33, the long pin 110 only will engage the gear 106 and advance this gear one tooth for each revolution of the shaft 24 which we have seen has its gear 23 rotated by the gear 20 under the control of the one way clutch controlled by solenoid SA by the closing of switch A so that after the feeding of ten packages of coins to the table 9, the gear 106 will have made one revolution and the pin 105 will have released latch 18x to allow the one way clutch shown in Fig. 36 to connect with shaft 22 so that through the previously described parts 40, 39, 38, 37, 36, and 33 the pusher member 28 will be operated to push the ten packages of coins over the table 9 and into the receptacle. This action takes place in handling coin packages for the penny, nickel, dime, and quarter denominations. For the half dollar coin packages as only five packages are loaded into the receptacle at a time, the drive member 109 is shifted toward the right as viewed in Fig. 33 so that both the long pin 110 and the shorter pin 111 will be in register with the gear 106. Then for each revolution of the shaft 23 as previously described the gear 106 will be advanced one tooth by contact with pin 110 and another tooth by contact with pin 111. Thus depending upon the positioning of the drive member 109 relative to the gear 106 will depend the number of packages delivered to the table 9 before the pusher member 28 inserts these packages into the receptacle to be filled.

For positioning the drive member 109, this member is normally moved to the position shown in Fig. 33 by a spring 112. For moving member 109 to the half dollar position, a lever 113 engageable at its upper end with member 109 pivoted intermediate its ends at 114 and carrying a push link or rod 115 is moved at its upper end toward the right to bring pin 111 into operative position by a crank arm 116 engaging and pushing toward the left on the rod 115 as indicated by the arrows in Fig. 38, said crank being mounted on the shaft 78 for the settable lever 79a which is the same as the lever 79 except that it has a switch operating projection 79b.

Referring to Fig. 40, it will be noted that in place of the solenoid SB and switch B, the parallel circuit 16 now contains a normally open switch B' and a normally closed switch C.

The switch B' is a reset switch in that on its closure current will flow from line 12 through line 16 to solenoid SA and return line 13 so that solenoid SA will be operated independently of switch A, and this switch is under the control of the operator by the movement of lever 79a to its reset position as shown in dotted in Fig. 37 so that projection 79b will act to close switch B' and allow cycling of the timing gear 106 by the operator until the timing gear 106 completes its cycle. This switch and the switch C are provided to take care of a condition which may arise in the use of the machine, to wit: the coin packaging machine may have delivered only a part of the number of packages to make up a row of coins to be loaded into an empty receptacle or partially filled receptacle, and it is decided to package another denomination of coins. If the number of coin packages already delivered is odd or even for pennies, nickels, dimes, or quarters, no trouble would be experienced in shifting to any of these demonominations, but if the number of packages of coins for pennies, nickels, dimes, or quarters is odd, then if a change were made to half dollar packages, the timing gear 106 would not function properly. To avoid this difficulty, we have provided the reset switch B' and the switch C. The switch B', it has been noted, is manually operated to energize the solenoid SA to allow the gear 106 to be reset, but to stop the gear 106 in its proper reset position after cycling the switch C is provided. Switch C is normally closed but is opened by a cam 117 on the hub of gear 106 engaging a lever 118 that engages the switch button 119 to open the switch when the gear 106 has been turned through the last of its ten teeth, so that said gear will then be in the proper position to be driven by its driver 109 when the control lever 79a is switched to the half dollar package denomination.

For the loading of packaged coins of any particular denomination, the operator sets the control member 79 or 79a at the designated denomination mark which acts to place the proper lowering stop bar 71 in operative position. The operator also adjusts the receptacle guide means including the movable bar 44 with associated bracket 56 and the plates 55 and 55a in proper position by moving the slider 48 from the handle 51 whose detent 52 is inserted in the designated denomination hole 53. In the first form described we have seen that movement of slider 48 to its set position also moves the stop 27 and switch B. In the second form the stop 27b is moved by the adjustable bar 44 and the timing drive gear 109 is adjusted simultaneously with the setting of the stop bar 71 by the turning of the shaft 78 by member 79a to move the arm 116, rod 115, and lever 113 to the desired set position.

The above adjustments having been made and a stack of empty receptacles having been placed in position with the lowermost one in the guide means above mentioned, the packaging machine is started and the switch S is closed to start the drive motor M. Then, as the packages of coins from the coin packager are discharged by gravity or in any other suitable manner into the guide chute 5 and into the temporary chute 6, 8 each package closes the switch A to energize the solenoid SA and set the feeder mechanism including pusher member 7 in operation to push these packages, one at a time, across the table 9. This action continues until in the first form the last of a predetermined number of packages is delivered to the table and acts through the rest of the line of packages to move the stop 27 to close switch B to energize solenoid SB which acts to set the mechanism including pusher member 28 in operation to deliver the whole row of packages into the receptacle as a single layer and in the second form until the timing gear 106 makes one revolution so that the one way clutch previously described can connect the gear 40 to the shaft 22 in the same way that the solenoid SB permits this clutch to function. As soon as any one layer of coin packages for the pennies, nickels, dimes, or quarters have been placed in the receptacle, the movement of the lever 33 acting through the link 84 will operate the previously set stop bar 71 to permit the receptacle to be lowered to a position to receive the next layer of coin packages, it being noted that for the half dollars the lowering of the stop bar 71 in two steps permits a charge of half dollars two deep, as a single layer. The above action of lowering of the receptacle proceeds until the last layer of coin packages is deposited in the receptacle and then on the release of the last stop shoulder of the stop bar 71, the filled package drops down to the tilted position shown in Fig. 28 and then slides forwardly on the elevator carriage 89 which then acts as previously described to carry the loaded receptacle up to the table 87 and onto the conveyor 88.

It will be noted that the machine provides means for feeding the coin packages, one at a time, to the table 9, means operable after a predetermined number of coin packages have been fed to said table for delivering these packages into the open end of a receptacle as a single layer of packages, settable means operable to lower the receptacle being filled, step by step, so that the desired number of layers are deposited in the receptacle, and means for carrying the loaded receptacle to a point of delivery.

We desire it to be understood that this invention is not to be limited to any particular form or arrangement of parts except in so far as such limitations are included in the cleams.

What we claim as our invention is:

1. In a machine for filling receptacles of varying sizes with packages of coins of different denominations or tokens of varying sizes, the combination of a table, adjustable means for positioning a receptacle of a size for the denomination of coin package being handled so that its open end faces said table, means for delivering a predetermined number of coin packages of a particular denomination or size to said table in a row, means for moving the row of coin packages into the positioned receptacle, selectively settable means for lowering said receptacle step by step as the rows of coins are deposited tier by tier into said receptacle, means for carrying the loaded receptacle to a point of delivery, said selectively settable means determining the amount said receptacle is lowered for any particular coin denomination, and operator controlled means for selecting the particular settable means for the coin denomination being handled.

2. In a machine for filling receptacles with packages of coins, the combination of a table, coin package controlled means for feeding packages of coins to said table to form a row of coin packages, means for positioning a receptacle so that its open end faces said table, settable means for predetermining the number of packages of coins that are to constitute a row, means for moving a row of coin packages into the positioned receptacle, and means controlling the position of the receptacle relative to the table as the same is filled with rows of packaged coins tier by tier.

3. In a machine for filling receptacles with packages of coins, the combination of a table, coin package controlled mechanism for feeding packages of coins to said table to form a row of packages, coin package row controlled mechanism for moving a row of packages from the table into a receptacle including a stop adjustably positioned for the coin packages of the particular denomination of coin being handled, and means controlling the position of the receptacle relative to the table as the same is filled with rows of packaged coins tier by tier.

4. In a machine for filling receptacles with packages of coins, the combination of a table, a coin package receiver, a switch having a control member projecting into said receiver and adapted to be actuated by the weight of a coin package in said receiver, an electrical circuit including said switch and a solenoid, pusher mechanism for moving a coin package from said receiver onto said table including a one revolution clutch, and clutch control mechanism controlled by said solenoid.

5. In a machine for filling receptacles with packaged articles of different sizes, means for depositing the packaged articles as a tier into the receptacle, and means for lowering the receptacle as the articles are deposited therein tier by tier, said means including a gravity actuated receptacle supporting platform and a series of pivotally mounted bars depending from said platform and having a series of stops thereon, a fixed stop, selectively settable means for determining which of said bars is to cooperate with said fixed stop, and means for moving the selected bar to progressively release the stops thereon from said fixed stop as the receptacle is loaded tier by tier.

6. In a machine for filling receptacles with packages, the combination of a table, means for positioning a receptacle so that its open end faces said table, means for delivering a predetermined number of packages to said table in a row, means for moving the row of packages as a unit into the positioned receptacle, a platform for carrying the receptacle, adapted to be lowered by gravity, means for controlling the descent of said platform so that rows of packages are deposited thereon tier by tier until the receptacle is filled, means for tilting said platform forwardly to discharge the loaded receptacle therefrom, an elevator having a receptacle receiving platform onto which said loaded receptacle is discharged and a continuously moving conveyor chain, and means operated by the receptacle as it is tilted onto said elevator receiving platform to connect said platform to said conveyor chain.

7. The structure as defined in claim 6 wherein the loaded package is pushed off of said elevator receiving platform when it reaches the end of its elevating movement by a movable pusher member associated with said platform.

8. In a machine for filling receptacles with packaged articles, the combination with a table, means for feeding packages, one at a time, to said table to form a row, means for feeding rows of packages into a receptacle, row by row, and means for lowering the receptacle as it is filled row by row including a shiftable bar having a series of stops, a fixed stop and means operable from said row feeding means for shifting said bar to release the stops thereon, one at a time, from said fixed stop.

9. In a machine for filling receptacles with package coins, the combination of a table, means for supplying a row of packages of coins to said table, means for predetermining the number of packages of coins making up a row including a timing gear and a drive for said gear settable to different positions, whereby half as many packages form a row for one setting of the driver as its other setting.

10. In a machine for filling receptacles of varying sizes with coins of different denominations or tokens of varying sizes, the combination of a table, adjustable means for positioning a receptacle so that its open end faces said table, means for delivering a predetermined number of packages of a particular denomination or size to said table in a row, means for moving the row of packages as a unit into the positioned receptacle, a platform for carrying the receptacle adapted to be lowered by gravity, means for controlling the descent of said platform to load the receptacle tier by tier and allow a partial descent of said platform after a row of packages have been deposited in the receptacle to permit the moving of two rows of coin packages, as separate units, into the positioned receptacle to form a single tier.

11. In a machine for filling receptacles of varying sizes with packages of varying sizes, the combination of a table, adjustable guide means for positioning a receptacle so that its open end faces said table, means for delivering a predetermined number of packages of a particular size to constitute a row including a stop connected with said adjustable guide means so that the adjustment of the guide means for the particular size of receptacle and the adjustment for the number of packages in a row is simultaneously effected, means for moving a row of packages into the positioned receptacle, and means controlling the position of the receptacle relative to the table as the same is filled tier by tier.

References Cited in the file of this patent

UNITED STATES PATENTS

| | | |
|---|---|---|
| 1,208,803 | Lienau et al. | Dec. 19, 1916 |
| 1,247,722 | Rogers et al. | Nov. 27, 1917 |
| 1,568,082 | Mitton | Jan. 5, 1926 |
| 1,787,739 | Wild | Jan. 6, 1931 |
| 1,905,370 | Mudd | Mar. 6, 1934 |
| 2,053,435 | Kimball et al. | Sept. 8, 1936 |